Figure 1:
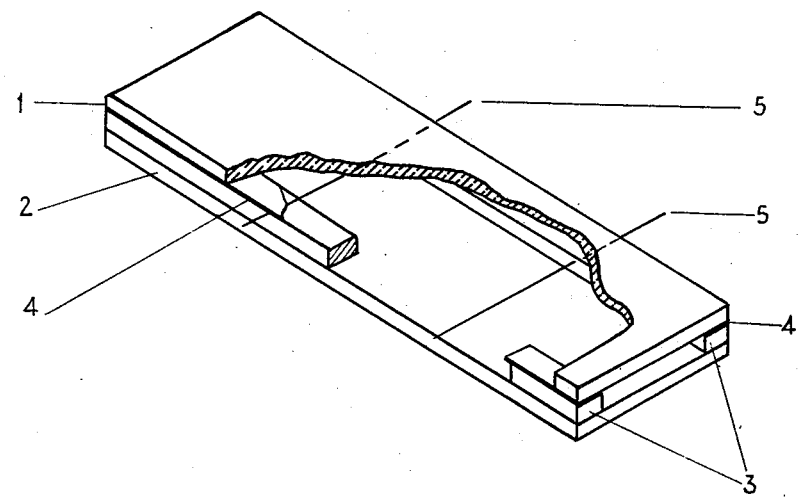

Oct. 22, 1963   W. PLAUT ETAL   3,107,986
FIBRE FILTERS FOR THE REMOVAL OF FINE MISTS
Filed March 29, 1960   2 Sheets-Sheet 1

INVENTORS
WALTER PLAUT
GEOFFREY LOWRIE FAIRS

BY Cushman, Darby & Cushman
ATTORNEYS

Oct. 22, 1963   W. PLAUT ETAL   3,107,986
FIBRE FILTERS FOR THE REMOVAL OF FINE MISTS
Filed March 29, 1960   2 Sheets-Sheet 2

INVENTORS
WALTER PLAUT
GEOFFREY LOWRIE FAIRS

BY Cushman, Darby & Cushman
ATTORNEYS

3,107,986
Patented Oct. 22, 1963

3,107,986
FIBRE FILTERS FOR THE REMOVAL OF
FINE MISTS
Walter Plaut and Geoffrey Lowrie Fairs, Runcorn, England, assignors to Imperial Chemical Industries Limited, London, England, a corporation of Great Britain
Filed Mar. 29, 1960, Ser. No. 18,333
Claims priority, application Great Britain Nov. 28, 1956
9 Claims. (Cl. 55—97)

The invention relates to fibre filters for removing fine mists from gases or vapours.

This application is a continuation-in-part of our application Serial No. 699,039, filed November 26, 1957, and now abandoned.

In the chemical industry it is often necessary to remove the mist occurring in gases or vapours and various methods have been adopted to remove such mists. The removal of the coarser mists of particle size greater than $5\mu$ is a comparatively simple procedure and may be effected by washing out with water or by passing the mist through an apparatus of the impingement filter type such as is described in the Transactions of the Institute of Chemical Engineers, 1944, Vol. 22, p. 112, the broad principle of operation when using such an apparatus being that the mist particles pass through the slots in a plate and then impinge on the strips of a second slotted plate and form a film which drains by gravity. With mists of fine particle size the procedure is not nearly so simple. Thus with the fine mists sometimes issuing as exit gases from plants handling or manufacturing sulphuric acid the various methods which have been employed are disadvantageous in one or more respects. For instance, they may call for high initial expenditure, or must be operated at a high pressure drop with consequent high energy requirements and therefore high running costs, or the efficiency of separation of the mists may be low so that the concentration of acid mist in the exit gas remains unduly high. Thus electrostatic filters are efficient in removing such mists and operate at low pressure drops but are expensive to install. Venturi washers in which the mist is driven at high velocity through a narrow throat into which a washing liquid is forced under high pressure are not cheap and call for very high pressure drops and therefore high consumptions of energy. A device which achieves a high degree of separation of the mist at the expense of a high pressure drop obviously still leaves something to be desired. Again even though the efficiency of separation by a particular method may be high, say 98% or more, if the filtered mist is of a sufficiently fine particle size then even though its sulphuric acid content may be quite low and may not cause heavy pollution of the atmosphere the filtered mist will still be visible.

One method among many that have been proposed from time to time for removing mists from gases is the use of glass fibre filters. These filters, however, are not capable of removing very fine mists such as the sulphuric acid mists referred to above with the result that the exit gas is persistently visible. In most countries the authorities concerned with the control of atmospheric pollution are tending increasingly to prohibit the passing to the atmosphere of mist even though, as said, its acid content may be very small. In consequence it is becoming increasingly necessary to resort to the use of very expensive precipitation or filtration equipment.

It is known that coarse fibre filters of large fibre diameter cannot be expected to remove mists of fine particle size. Further it is to be expected that by using a filter of smaller fibre diameter some improvement in efficiency of filtration of mists will be obtained. We find, however, that mere choice of a filter of the appropriate fibre diameter will certainly not of itself solve the problem of removing from gases and vapours the very fine mists with which the present invention is concerned.

Detailed microscopical examination has shown that when a gas or vapour containing a fine mist is passed through a fibre filter made from any of the materials hitherto used for that purpose, for instance, cotton wool, slag wool or glass wool, the diameters of the constituent fibres being so chosen in relation to the size of the mist droplets that they can be expected to trap the mist, then such droplets as are trapped wet the fibres and form a film of liquid thereon. This film is not of uniform thickness—indeed at a first inspection it may appear that discrete droplets are held on the fibres, but closer examination shows that the droplets are not separate and independent but that a film of liquid, substantially continuous, surrounds the fibre and extends from one droplet to the next.

By contrast, and most unexpectedly, we have found that with another class of fibres which, for convenience, we term "non-wettable" fibres, an outstanding and most surprising increase in filtration efficiency is obtained; these are fibres whereon the mist is deposited in separate and independent droplets not connected (as in the case of the "wettable" fibres hitherto used) by a bridging film of liquid.

However, the problem of making a suitable fibre filter for fine mists is not, as might be imagined in view of the findings just described, simply a matter of utilising a hydrophobic or water-repellant fibre. We have found, for instance, that silicone-treated glass wool, garnetted "Terylene" polyester fibre ("Terylene" is a registered trademark) and polyacrylonitrile fibre form outstandingly effective fibre filters, whereas untreated glass wool, nylon staple fibre, polyvinyl chloride fibre, slag wool, polyvinyl acetate fibre and cellulose triacetate fibre are not effective as filters for fine mists. Yet if these various fibres are arranged in order of increasing water-repellency as measured by the mean contact angles between the fibres and 10% sulphuric acid the list is: untreated glass wool, polyvinyl acetate and polyacrylonitrile fibre, cellulose triacetate, nylon, garnetted "Terylene" polyester fibre, silicone-treated glass wool and polyvinyl chloride. Thus polyvinyl chloride fibre shows the greatest water-repellancy of all and yet is not highly efficient as a filter medium, and on the other hand polyacrylonitrile fibre has a smaller contact angle than nylon yet the former is incomparably better as a filter medium than nylon. It has similarly been found impossible to relate filtration efficiencies with other measurable properties, for instance, "moisture regain" i.e. the percentage of water absorbed by the vacuum-dried filter when allowed to come to equilibrium with an atmosphere saturated with water vapour at 20° C. In fact if the same fibres are arranged in order of diminishing moisture regain (increasing water-repellency) the list is cellulose triacetate, polyvinyl acetate, nylon, silicone-treated glass wool, polyvinyl chloride, polyacrylonitrile, garnetted "Terylene" polyester fibre and untreated glass wool. It will be seen that on this basis untreated glass wool is the most water-repellent of the fibres, yet silicone-treated glass wool, garnetted "Terylene" polyester fibre and polyacrylonitrile are all much more efficient as fibre filters. Likewise cellulose triacetate appears to be the least water-repellent of the listed fibres, yet a filter made therefrom is more efficient than filters made from nylon or from polyvinyl chloride. Again polyvinyl acetate has approximately ten times the moisture regain of untreated glass wool, yet their efficiencies as fibre filters are comparable. Therefore the superficially attractive theory that first springs to mind on considering our initial observations, namely, that hydrophobic fibres should be effective, does not accord with the experimentally determined relative efficiencies of various types of fibre. It is indeed evident that the requirements for an effective fibre are complex and it does not seem that assessment of the wettability of the fibre by measuring any of its simpler fundamental properties will provide a criterion that will distinguish effective fibres from non-effective fibres.

Figure 4:
Figure 5:
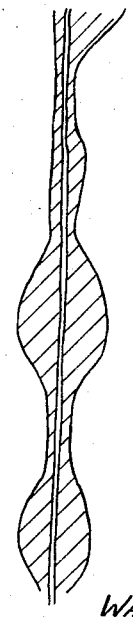

We have therefore based ourselves on the empirical observations recounted above, namely, that the effective fibres are those whereon the trapped mist particles remain as separate independent droplets, whereas the ineffective fibres (even including those such as nylon which are customarily regarded as water-repellent fibres) are wetted so that the fibre is surrounded by a substantially continuous film of liquid bridging the spaces between one droplet and the next. For the purposes of this specification and claims we term the fibres of the first category "non-wettable" and those of the second category "wettable." It is our experience that only the "non-wettable" fibres are capable of forming effective fibre filters for really fine mists, that is, mists the particles whereof are in the main less than 5$\mu$ in diameter.

Also we find with our "non-wettable" fibres, as is already known in respect of conventional fibre filters, that for high filtration efficiency the fibres should not be all of the same diameter but should vary over the range of, for instance, 5$\mu$ to 50$\mu$. We have proved this particularly in the case of "Terylene" polyester fibre by comparing the efficiencies of filters made on the one hand from staple fibres of uniform diameter and on the other hand from garnetted staple fibre. Garnetting is a process of carding of the staple fibres in the course of which some of them are cold drawn to varying degrees, in consequence of which the initially uniform mass of fibres becomes converted into a heterogeneous and partly aligned mass showing a considerable variation in fibre diameter. For filtering mists with particles less than 5$\mu$ it is desirable that the diameters of most of the fibres of the filter should be distributed in the range 5$\mu$ to 50$\mu$.

According to the present invention, therefore, an improved method of removing mists of particle size less than 5$\mu$ from gases or vapours comprises passing the mist-containing gas or vapour through an unwoven fibre filter composed of individual and separable "non-wettable" fibres of various diameters ranging from 5$\mu$ to 50$\mu$, and depositing said mist on said filter substantially completely in the form of discrete droplets held on the surface of said fibres, the spaces between the droplets being substantially free from film-like deposits.

Fibrous materials made of most diverse materials may be used most effectively as filters to remove said finely divided mists provided, of course, that they are sufficiently inert to the liquid constituting the mist and also the entraining gas or vapour and provided also that on passing mist through the filter the deposition of the mist occurs not by film formation but by deposition of discrete droplets as more particularly hereinbefore described.

Direct observation of the way in which the mist particles are deposited on the fibres of a filter operating in commercial practice is not easy to arrange and in our work with many varied types of fibres we have found that we have been able to forecast whether a given fibre will be effective or not by using a simplified test wherein a fine mist of the liquid it is desired to filter out is passed transversely across one or more specimen fibres held rigidly in the field of a microscope objective. This can be simply arranged by constructing a small cell from a pair of microscope slides held parallel to each other and a short distance apart by means of glass spacing blocks located along their edges. The fibres are stretched across the cell so formed and the mist to be examined is passed through the cell.

A convenient form of such cell is illustrated in FIGURE 1 of the accompanying drawings which represents the cell in section and partly cut away so as more readily to exhibit its construction. In this sectional drawing the microscope slides 1 and 2 are held apart by the glass spacer block 3. Deformable packings or shims 4 are located between the spacer blocks and the upper microscope slide, the slides, shims and spacers thus defining an open-ended rectangular cell. Fibres to be examined (5) are held between the shims and spacers so as to lie transversely across the cell and in the path of the mist-containing gas which is passed through the cell from one end to the other End-plates bearing inlet and off-take pipes (not shown) are sealed to the ends of the cell and serve to carry the mist-containing gas to and from the cell which is mounted in the field of a microscope objective. If desired, of course, it is easy to arrange to photograph the fibres with their attached droplets so that their precise form and disposition can be studied at leisure.

It is our experience, from experiments carried out in this way with various fibres, that the acceptability or otherwise of a fibre can usually be decided upon by studying such photographs of the fibre made after contacting the fibre with a mist entrained in any suitably available carrier gas such as air without the particle size or concentration of the mist necessarily being the same as that of the actual mist which it is desired to filter.

As illustrative only of the various fibres which permit formation of discrete droplets from the mist and which may be used as fibre filters to give the improved results of the present invention may be mentioned glass fibres having an adherent silicone surface and garnetted "Terylene" polyester fibres ("Terylene" is a registered trademark). Of the types of fibres which give rise to film formation with droplets surrounding the fibre and which will not provide the improved filtration of fine mists according to the invention there can be mentioned untreated glass fibres and untreated nylon.

A better indication of the type of deposition of mist on these fibres will be seen from the FIGURES 2–5 of the drawings. These figures are accurate drawings of microphotographs that were obtained by passing sulphuric acid mist particles entrained in air into contact with various fibres in the apparatus described hereinbefore. The sulphuric acid mist was merely developed by passing air through vessels containing water, then through 10% oleum, through water again and finally through an empty vessel to remove spray. The mist particles thus produced and which finally came into contact with the fibres were very fine and smaller in diameter than 5$\mu$. It was possible to forecast by observing the manner of deposition of the mist on the fibres which fibres would or would not remove mists of a very fine particle size from gases or vapours containing the same. FIGURE 2 shows the results obtained with glass staple fibre having an adherent silicone surface wherein the mist is deposited in the form of discrete droplets attached to the surface of but not surrounding the fibres with no evidence of film formation on the fibre The silicone surface was applied by using a silicone fluid with the code number M441 as more particularly described hereinafter. FIGURE 3 shows similar results obtained with garneted "Terylene" polyester fibre ("Terylene" is a registered trademark). It will be noted that in FIGURE 3 and to a lesser extent in FIGURE 2 droplets are shown which may appear to surround the fibre. This, however, is not the case, they are merely droplets which are held on the fibre precisely like the others, but which have swung round to hang below the fibre. The arrangement of the apparatus was such that the gas stream was passed horizontally in a direction at right angles to the axis of the horizontally supported fibre (both these being viewed in the plane of the paper) and the observations were made from vertically above, and thus in a direction at right angles to both gas stream and fibre. The point to be noted about these pendant droplets is that they are virtually hemispherical; the contrast with droplets which do wet the fibre (see FIGURES 4 and 5) is marked, the latter being lenticular and tapering off at the ends. Observation in this way readily and reliably enables one to distinguish between these cases of real and apparent wetting and thus to discriminate between the "wettable" and the "non-wettable" fibres. FIGURE 4 shows the results obtained with untreated glass staple fibre wherein the mist is deposited in a continuous film on the fibre which film thickens out at intervals into droplets surrounding the fibre. The continuous film surrounding the fibre and bridging the intervals between droplets can be seen particularly clearly in the case of FIGURE 5 which shows the results obtained with nylon.

Figure 2:
Figure 3:
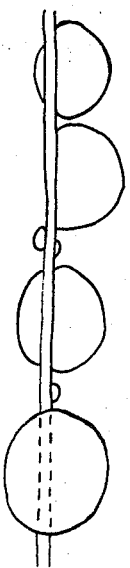

In practical tests on a sulphuric acid plant flat cylindrical fibre filters of 76 cms. diameter and 5 cms. thick were constructed of each of the four fibres just mentioned and used on a works scale in an attempt to remove sulphuric acid mist of approximate concentration of 0.5 g. $H_2SO_4/m.^3$ and of particle size less than $2\mu$ from the plant exit gases. As could be forecast from FIGURES 2 and 3 the fibre filters made from silicone-treated glass wool and garnetted "Terylene" polyester fibres ("Terylene" is a registered trademark) effectively removed these fine mists. In contradistinction, as could be forecast from FIGURES 4 and 5, fibre filters made from untreated glass wool and from nylon were not capable of effectively removing these fine mists. The distribution of fibre diameters among the fibres constituting the filters was substantially the same in each of the four cases so that the only significant difference was the nature of the fibre used.

The material of the fibre filters of the present invention will obviously be one which is chosen having the regard to possible attack by the mist and the mist-containing gas or vapour. The material of construction should not be one which is liable to rapid attack by the mist or the gas entraining the mist. Thus we have employed garnetted "Terylene" polyester fibre filters for a period of 10,000 hours to remove very fine sulphuric acid mist with no visible exit and with no deterioration of the fibres at the end of this period. If the material is reasonably slowly attacked in this way then it may well be permissible to use a fibre filter made of material which is not completely inert and to replace the filter in the course of time. The same holds good for filters having an adherent surface layer which may be slowly attacked, for instance, a filter comprising glass fibres having an adherent silicone surface. For example, if such a filter is employed for removing fine sulphuric acid mists of fairly high concentration there may be attack on the silicone surface after a reasonable period of time. This filter may then be removed, treated again with silicone and used again to remove the mist.

In the case of fibre filters having an adherent silicone surface the silicones which are applied to the glass fibre surface may be generally described as organo-silicon compounds containing polysiloxane linkages. These may suitably be applied to the glass fibres in the form of silicone fluids and silicone resins. The term "silicone fluid" or as it is sometimes called "silicone oil" is to be understood as applying to liquid products which do not lose their liquid character on heating and which may be obtained by hydrolysis and polymerisation of an intermediate material consisting essentially of dialkyl-dichlorosilane. Silicone fluids may also be obtained in which alkyl groups are replaced by aryl and alkenyl groups. Silicone resins may be liquid or solid products derived from intermediate materials which are mixtures of dialkyl-dichlorosilane and trialkylchlorosilane. These resins may also be obtained from alkyl-hydrogen dichlorosilane and silicone resins having aromatic substituents can also be obtained which are liquid in nature. Although the word resin suggests a solid or semi-solid nature silicone resins can indeed be liquid products which only become solid if they are caused to undergo further condensation by heating.

One particular silicone fluid which is useful for treatment of these fibres consists of a product which is obtained by the partial hydrolysis and polymerisation of a methylchlorosilane mixture consisting essentially of dimethyl-dichlorosilane, which product still contains in addition to its polysiloxane groups from 16% to 26.6% silicon-bound chlorine. This means that the terminal groups of the polymer still contain unhydrolysed methylchlorosilane residues. Such a material is available commercially and may be obtained under the trade name Silicone Fluid M441 from Imperial Chemical Industries Limited. To provide an adherent surface on the said glass fibres with this silicone fluid the fibres are immersed in a 2% solution in white spirit of the silicone, allowed to drain and dried at 110° C.

When using such filters an extremely high separation, up to 100%, of mists from gases and vapours can be achieved. In particular the filters can be used at a fairly low pressure drop to reduce the sulphuric acid content of fine sulphuric acid mists to nil, or practically so, with the result that the persistent visible exit associated with sulphuric acid mists of very fine particle size can be eliminated. The present method of removing mists from gases and vapours is a simple, convenient and reliable one and calls for a relatively simple filter plant. Filter units such as those composed of glass fibres alone or wool felt treated with silicone become quickly logged up with liquid deposited from the incoming gas or vapour and in a short time do not even permit passage of the mist-laden gas so that they are entirely useless for removing extremely fine mists from gases or vapours. The present filters permit continual drainage of the trapped liquid particles and of course show greatly improved results over these other filter units; they have in fact none of the disadvantages associated with the other previously described methods and constitute a valuable contribution to the art.

A further aspect of the invention is the provision of unwoven fibre filters for the removal from gases of vapours of mists of a particle size less than $5\mu$ comprising individual and separable "non-wettable" fibres mostly of fibre diameter in the range of $5\mu$ to $50\mu$, a "non-wettable" fibre being defined as one whereon the mist can be deposited substantially completely in the form of discrete droplets held on the surface of, but not surrounding, the fibres, the space between the droplets being substantially free from film-like deposits.

The present filters are of relatively large voidage as compared with wool felts and are usually of packing densities (p.d.) of about 5 to 20 lb./cu. ft. Below a p.d. of 5 lb./cu. ft. the filters are mechanically weak while above 20 lb./cu. ft. the voidage is too low to permit passage of the gas at a reasonable rate. Preferably the packing densities of our fibres are about 5 to 10 lb./cu. ft. Suitably the mist-laden gas is passed through the filters at a pressure drop of about 6 to 12 inches water gauge.

Now the true densities of fibres vary from material to material and a packing density of 10 lb./cu. ft. in the case of a filter mat composed of "Terylene" fibres indicates much denser packing than in a glass fibre packed to a density of 10 lb./cu. ft. because the density of glass fibres is twice that of "Terylene" fibres. A concept which enables one to make a truer comparison of the performance of different types of fibres is the voidage appropriate to the packing densities at which the present filters are employed. The voidage (percent) of a fibre filter is $$\frac{\text{True density} - \text{packing density}}{\text{True density}} \times 100$$

Details comparing the densities with voidage of our filters with the density and voidage of materials hitherto proposed, for instance, wool felt and silicone-treated wool felt are given in the table hereinafter. The wool felt was treated by dipping the felt into a 2% solution of a dimethyl polysiloxane having a viscosity of 300 centistokes at 38° C. in methyl ethyl ketone, draining off the excess solution from the felt and then drying in air.

| Fibre | Packing Density, lb./ft.³ | True Density, g./cm.³ | Voidage, percent |
|---|---|---|---|
| Garnetted "Terylene" Polyester Fibre | 10 / 5 | 1.38 | 88 / 94 |
| Silicone Treated Glass Fibres | 20 / 10 / 5 | 2.77 | 88.5 / 94 / 97 |
| Untreated Wool Felt | 35.6 | 1.33 | 57 |
| Silicone Treated Wool Felt | 36.9 | 1.33 | 56 |

The voidage of our "non-wettable" fibre filters with p.d. in the range 5–20 lb./cu. ft. are in the range 80% to 98%, suitably 88% to 98%. Our fibre filters are obviously of much less packing density and of much greater voidage than wool felt customarily used for the filtration of dust particles from air.

The filters of the present invention may be obtained by packing the fibres to the required packing density and holding the packed fibres between confining metal gauzes. Filters of various sizes and shapes may be made by this method and used effectively to remove very fine mists from gases and vapours containing the same. However, such a method of making the filters has some drawbacks. Thus the filters may be packed and held under considerable compression between retaining members such as gauzes if channelling of the filter bed is to be avoided. Hence in use the retaining members are held under stress in a possibly corrosive atmosphere and thus are particularly liable to suffer corrosion.

We have further found that these disadvantages may be avoided by utilising a fibre that is in some degree thermoplastic, preforming the filter in a mould in which the requisite compression is applied, heating the filter so as to relieve the stresses and then removing the stabilised and now self-supporting filter from the mould. Any desired surface treatment, such for instance, as the application of a silicone to a glass filter may be applied after the stress relieving operation is completed.

The particular heat treatment conditions required and the results obtained depend of course on the nature of the particular fibres to be treated. The heat treatment conditions which are suitable for a particular fibre can easily be determined experimentally. For example, we have found that preformed, flat, cylindrical filter mats can be obtained by compressing the calculated quantity of glass fibres in a mould to the appropriate packing density and heating while under compression at 400° C. to 550° C. for ½ hour to 2 hours. The time and temperature may be varied within fairly wide limits and useful preformed glass fibre mats can be obtained with heat treatments at 400° C. for 1 hour, at 500° C. for 1 to 2 hours and at 550° C. for ½ hour. In particular we find that very satisfactory results can be obtained with a heat treatment of 1 hour at 500° C. With more drastic heat treatment operations, for example at 650° C. for ½ hour, the compact shrinks considerably so that its shape is not maintained and the mould is no longer filled. The preformed glass fibre filter after the heat treatment may then be provided with an adherent silicone surface as hereinbefore described and can then be used to filter fine mists according to the invention.

Some fibres, for example, "Terylene" polyester fibres ("Terylene" is a registered trademark) experience a considerable shrinkage in volume on heating and to prevent this happening in the mould such fibres may be preheated to allow for this shrinkage. Thus garnetted "Terylene" polyested fibres ("Terylene" is a registered trademark) are first heated say in an oven at substantially 140° C. for 1 hour and then a filter of desired shape is made by compressing these preshrunk fibres in a mould and heating while under compression at 170° C. for 1 hour. Again a "Terylene" polyester fibre bath may already have been subjected to a heating treatment in which case it will not require a preshrinking operation. All that is required in this case is that the said preshrunk fibres be compressed in a mould and treated while under compression at substantially 170° C. for 1 hour.

Such preformed filters may be made in various shapes, for example in the form of a flat solid mat or alternatively in the form of deeper hollow cylinders (or annuli) which can be placed end to end to form a filter candle. The mould in the latter case can be in the form of two concentric cylinders, the filter being moulded in the annular space between them. A number of these filter candles may be placed one on top of the other, suitably separated by sealing rings of superfine glass wool. By this means liquor formed by deposition from the mist in the filter candle is held on each sealing ring and drains off. If no means are provided to hold up and drain liquor deposited in individual filters this could result in too high a build-up of liquor in the bottommost filter candle. The filter unit can be placed in a pipe and the mist-laden gas passed into the side of the pipe and through the filter unit, the mist trapped by the filter candles draining by gravity.

It should be noted that the heat treatment operation is not for the purpose of sintering or fusing the fibres. The purpose of the heat treatment operation is to relieve stresses in the fibres. After the heat treatment the fibres are in fact unaltered except for the relief of the bending stresses imposed on the fibres during compression and the individual fibres could, if need be, be picked out and made to re-occupy their original uncompressed volume.

The filters thus made are easier to replace and cheaper to install than those made by compressing the fibres and holding by confining gauzes.

The following examples illustrate the invention.

EXAMPLE 1

In a plant for the manufacture of sulphuric acid the gases leaving the contact chamber were first cooled, then absorbed in strong sulphuric acid and subsequently passed through alkali-containing absorption towers. The sulphuric acid content of the mist-containing exit gas varied between 0.05 and 0.1 gram $H_2SO_4$ per cubic metre of gas and the mist particles were all of size less than $2\mu$, 10% of them by weight being less than $1\mu$.

Glass fibre of diameters in the range $5\mu$ to $50\mu$ was treated with the Silicone Fluid M441 in the manner previously described and was packed and compressed to a density of 10 lb./cu. ft. (160 kg./m.³) to form a layer 5 cm. deep and the filter was held between confining gauzes made of resin-coated stainless steel. The surface area of the filter presented to the gas stream was approximately 0.46 square metre. The mist-containing exit gas was passed downwardly through the filter at the rate of 300 to 350 m.³/hr. per square metre of filter surface and the pressure drop was 19 cms. water gauge. While the filter was in continuous operation for over 900 hours there was no visible fume in the exit gas and a weak acid varying in strength between about 2½% $H_2SO_4$ and about 10% $H_2SO_4$ was collected by drainage from the filter. The sulphuric acid content of the exit gas as measured by means of an electrostatic sampler was less than 0.0007 to 0.0008 g./m.³.

*Comparison*

By way of comparison the example was repeated except that the mist-containing gas was passed through a similar filter of untreated glass fibre but in this case a persistency visible gas left the filter, the sulphuric acid content of the tail gases being 0.007 to 0.012 g./m.³.

EXAMPLE 2

Glass fibres of diameters in the range $5\mu$ to $40\mu$ were packed and compressed in a mould to a density of 10 lb./cu. ft. to form a layer 5 cms. deep. The glass fibres were then heated while under compression for 1 hour at 500° C. and were subsequently treated with Silicone Fluid M441 in the manner previously described. The filter was in the form of a flat cylindrical mat 76 cms. in diameter.

A mist-containing gas as described in the previous example was passed downwardly through the filter at the rate of approximately 250 to 300 m.$^3$/hr. per square metre of filter surface and the pressure drop was 24 to 25 cms. water gauge. The filter was in continuous operation for over 3000 hours and there was still no visible fume in the exit gas. The acid varying in strength between 1.5% $H_2SO_4$ and 12% $H_2SO_4$ was collected by drainage from the filter. The average sulphuric acid content of the exit gas from the filter as measured by an electrostatic sampler was 0.0007 to 0.001 g./m.$^3$.

EXAMPLE 3

Garnetted "Terylene" polyester fibres ("Terylene" is a registered trademark) of fiber diameters in the range $10\mu$ to $40\mu$ were packed and compressed to a density of 10 lb./cu. ft. to form a layer 5 cms. deep and the filter was held between confining gauzes of resin-coated stainless steel. The surface area of the filter presented to the gas stream was approximately 0.89 square metre.

A mist-containing gas described in Example 1 was passed downwardly through the filter at the rate of 225 to 280 m.$^3$/hr. per square metre of filter surface at a pressure drop of 23 to 24 cms. water gauge. The filter was in continuous operation for over 3000 hours and there was still no visible fume in the exit gas. An acid varying in strength between 7% $H_2SO_4$ and 21% $H_2SO_4$ was collected by drainage from the filter. The sulphuric acid content of the exit gas from the filter as measured by an electrostatic sampler varied between 0.0007 g./m.$^3$ and 0.0015 g./m.$^3$.

EXAMPLE 4

Garnetted "Terylene" polyester polyester fibres ("Terylene" is a registered trademark) of fibre diameters in the range $10\mu$ to $40\mu$ were pre-shrunk by heating the fibres without compression at 140° C. for 1 hour. The pre-shrunk fibres were then packed into a quadrant-shaped mould and compressed to a density of 10 lb./cu. ft. to form a layer 5 cms. deep. The fibres were then heated while under compression for 1 hour at 160° C. The filter was in the form of a flat cylindrical mat formed by four quadrants of 38 cms. radius.

The exit gas containing sulphuric acid mist as described in Example 1 was passed downwardly through the filter at the rate of 240–300 m.$^3$/hr. per square metre of filter surface at a pressure drop of 23 cms. water gauge. The filter was in continuous operation for 2500 hours during which time there was no visible fume in the exit gas, the sulphuric acid content of the exit gases as measured by an electrostatic sampler varying between only 0.005 g./m.$^3$ and 0.001 g./m.$^3$.

EXAMPLE 5

Garnetted "Terylene" polyester fibres of diameters in the range $10\mu$ to $40\mu$ were pre-shrunk by heating the fibres without compression at 140° C. for 1 hour. The pre-shrunk fibres were then introduced into a mould which involved packing them into the annular space between two concentric cylinders of 20 cms. diameter and 10 cms. diameter and compressing to a density of 10 lb./cu. ft. The fibres were then heated under compression for 1 hour at 160° C. The complete filter was composed of four of these elements set one upon the other in a vertical position with layers of superfine glass wool situated between them, so as to trap and drain from them liquor formed by departure of the mist in the filter element.

Exit gas containing sulphuric acid mist as described in Example 1 was passed horizontally through the filter elements in an inward direction at the rate of 430 m.$^3$/hr. per m.$^2$ of filter surface at a pressure drop of 25 cms. water gauge. The filter was in operation for 3000 hours during which time there was no visible fume in the exit gas, the average sulphuric acid content of the exit gas from the filter being between 0.0005 and 0.0007 g./m.$^3$.

EXAMPLE 6

Glass fibres of diameters in the range $5\mu$ to $40\mu$ were packed and compressed in a mould to a density of 19 lb./cu. ft. to form a layer 5 cms. deep. The glass fibres were then heated while under compression for 1 hour at 500° C. and were subsequently treated with Silicone Fluid M441 in the manner previously described. The filter was in the form of a flat cylindrical mat 15 cms. in diameter.

A mist-containing gas as described in Example 1 was passed downwardly through the filter at the rate of 19.4 m.$^3$/hr. per square ft. of filter surface and the pressure drop was 21 cms. water gauge. The filter was in operation continuously for 6 full days with no visible exit. The acid content of the exit gas was barely detected by analytical methods and the efficiency of the fibre filter may be taken as 100%. There was no deterioration in results throughout the trial period and the run was discontinued.

EXAMPLE 7

Garnetted "Terylene" polyester fibres ("Terylene" is a registered trademark) of fibre diameters mostly in the range $10\mu$ to $40\mu$ were pre-shrunk by heating the fibres without compression at 200° C. for 1 hour. The pre-shrunk fibres were then packed and compressed to a density of 6 lb./cu. ft. in the annulus between two cylinders one 20 cm. in diameter and the other 10 cm. in diameter, the height of the cylinders being 20 cm. The fibres were then heated while under compression at 200° C. for 1 hour. The filter produced was thus in the form of a filter candle and three more such filters were made and placed one on top of the other to form a filter unit.

From a burner bay air was withdrawn containing mainly sodium chloride particles together with sodium oxide particles, the concentration of the particles being about 0.5 g./m.$^3$. The air was then humidified by passing it through a cylindrical tower 36 dms. high and of 30 cms. diameter fitted with water sprays at levels of 35 cms., 110 cms. and 170 cms. from the bottom of the tower and delivering fine sprays of water at 50° C. After leaving the tower the air was passed at a rate of 614 to 790 m.$^3$/hr. per square metre of filter surface at a pressure drop of 19 to 22 cms. water gauge through the filter. The filter was operated continuously over a period of 1,656 hours and there was no visible exit from the filter, the concentration of the impurities in the exit gas leaving only 0.005 g./m.$^3$. Since the drainage of liquid from the filter was only of the order of 0.02 l./hr. as compared with the rated input of 22 l./hr. of the spray nozzles it was clear that the major effect of the sprays was to humidify the gas rather than to provide entrained droplets.

What we claim is:

1. An improved unwoven, unfelted fibre filter of voidage 80% to 98% for the removal from gases or vapours of aqueous mists of particle size less than $5\mu$ comprising individual and separable, "non-wettable" fibres of various diameters ranging from $5\mu$ to $50\mu$, a "non-wettable" fibre being defined as one whereon the mist can be deposited substantially completely in the form of discrete droplets held on the surface of, but not surrounding the fibres, the spaces between the droplets being substantially free from film-like deposits.

2. An improved fibre filter according to claim 1 wherein the filter is composed of glass fibres having an adherent silicone surface.

3. An improved fibre filter according to claim 2 wherein the silicone applied to the surface of the fibres is a partially hydrolyzed and polymerized product of a methyl chlorosilane mixture consisting essentially of dimethyldichlorosilane, which product contains in addition to its polysiloxane groups from 16% to 26.6% silicon-bound chlorine.

4. An improved fibre filter according to claim 1 wherein the filter is composed of garnetted "Terylene" polyester fibres.

5. An improved unwoven, unfelted fibre filter of voidage 88% to 98% for the removal from gases or vapours of aqueous mists of particle size less than $5\mu$ comprising individual and separable, "non-wettable" fibre of various diameters ranging from $5\mu$ to $50\mu$. a "non-wettable" fibre being defined as one whereon the mist can be deposited substantially completely in the form of discrete droplets held on the surface of, but not surrounding the fibres, the spaces between the droplets being substantially free from film-like deposits.

6. An improved fibre filter according to claim 5 wherein the filter is composed of glass fibres having an adherent silicone surface.

7. An improved fibre filter according to claim 6 wherein the silicone applied to the surface of the fibres is a partially hydrolyzed and polymerized product of a methyl chlorosilane mixture consisting essentially of dimethylchlorosilane, which product contains in addition to its polysiloxane groups from 16% to 26.6% silicon-bound chlorine.

8. An improved fibre filter according to claim 5 wherein the filter is composed of garnetted "Terylene" polyester fibres.

9. An improved process for removing aqueous mists of particle size less than $5\mu$ from gases which comprises passing a mist-containing gas through an unwoven, unfelted fibre filter of voidage 80% to 98% composed of individual and separable "non-wettable" fibres of various diameters ranging from $5\mu$ to $50\mu$ and depositing said mist on said filter substantially completely in the form of discrete droplets held on the surface of said fibres, the spaces between the droplets being substantially free from film-like deposits.

References Cited in the file of this patent
UNITED STATES PATENTS

| | | |
|---|---|---|
| 2,251,964 | Stackhouse | Aug. 12, 1941 |
| 2,392,805 | Biefeld | Jan. 15, 1946 |
| 2,568,144 | Cremer et al. | Sept. 18, 1951 |
| 2,568,384 | Cheronis | Sept. 18, 1951 |
| 2,774,443 | Slayter | Dec. 18, 1956 |
| 2,774,690 | Cockett et al. | Dec. 18, 1956 |
| 2,804,936 | Stampe | Sept. 3, 1957 |
| 2,839,158 | Reinauer | June 17, 1958 |
| 2,882,997 | Smith et al. | Apr. 21, 1959 |
| 2,947,383 | Schytil et al. | Aug. 2, 1960 |

FOREIGN PATENTS

| | | |
|---|---|---|
| 474,457 | Italy | Sept. 24, 1952 |
| 721,162 | Great Britain | Dec. 29, 1954 |